United States Patent [19]

Kohler et al.

[11] 4,347,641

[45] Sep. 7, 1982

[54] WIPER ARM

[75] Inventors: Alfred Kohler; Hans Prohaska, both of Bietigheim-Bissingen, Fed. Rep. of Germany

[73] Assignee: ITT Industries, Inc., New York, N.Y.

[21] Appl. No.: 151,297

[22] Filed: May 19, 1980

[30] Foreign Application Priority Data

May 17, 1979 [DE] Fed. Rep. of Germany ....... 2919867

[51] Int. Cl.³ .............................................. B60S 1/34
[52] U.S. Cl. ................................... 15/250.35; 72/377
[58] Field of Search ............ 15/250.32, 250.42, 250.2; 72/197, 198, 377

[56] References Cited

U.S. PATENT DOCUMENTS

| 762,889 | 6/1904 | Douglass | 15/250.20 |
| 2,353,208 | 7/1944 | Whitted | 15/250.35 |
| 2,711,553 | 6/1955 | O'Shei | 15/250.35 |
| 3,042,955 | 7/1962 | Oishei | 15/250.35 |
| 3,339,222 | 9/1967 | Bock et al. | 15/250.35 |
| 3,480,985 | 12/1969 | Forster | 15/250.35 |

*Primary Examiner*—Peter Feldman
*Attorney, Agent, or Firm*—James B. Raden; Donald J. Lenkszus

[57] ABSTRACT

A wiper arm includes a wiper rod which is directly formed from wire rod.

1 Claim, 6 Drawing Figures

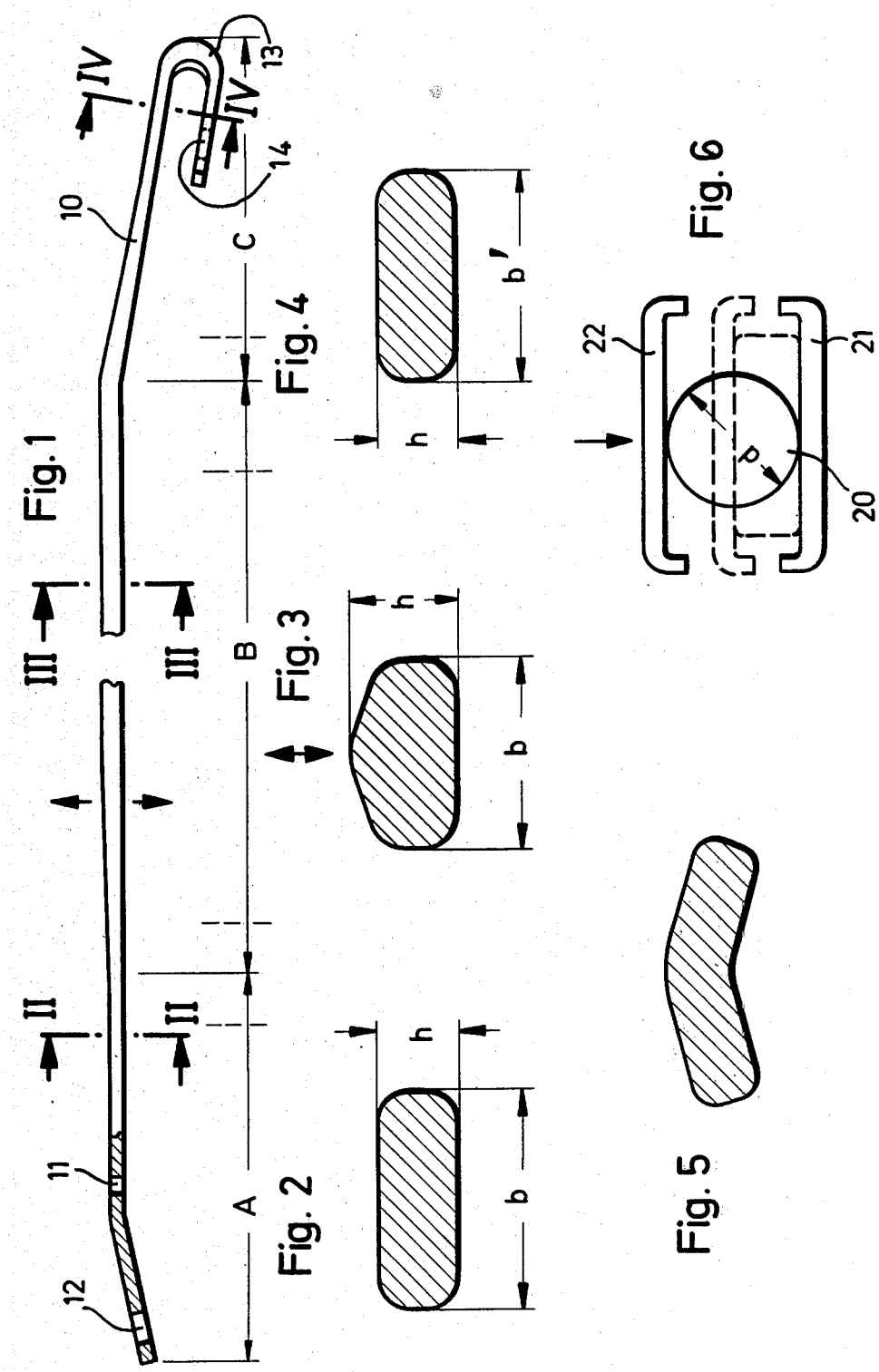

WIPER ARM

BACKGROUND OF THE INVENTION

The invention pertains to a windshield wiper arm, especially for motor vehicles, comprising a link and a wiper rod fixed thereon having a cross-section varying from a circular form.

For the production of such wiper rods until now a wire rod has been rolled to a flat band and this steel band was then bent to the desired shape in further production steps. A disadvantage of this generally used production technique is that said steel band is not available on the market with all necessary dimensions and that special types are very expensive. The original product, the wire rod, in contrast thereto is readily available with all necessary dimensions.

Wiper rods are already known which at their one end have a hook for fastening the wiper blade. At the other end the wiper rod is usually held in a link by means of a rivet connection. In this end area the wiper rod has a bore into which the rivet shank is put. In most cases a further bore for the suspension of a pull spring is provided.

The invention is therefore directed to the problem of providing a wiper arm the wiper rod of which can be produced more economically.

SUMMARY OF THE INVENTION

This problem is solved according to the invention in that the wiper rod is directly formed of a wire rod. Thus the expensive rolling is saved. Wiper rods with differing cross-sections can be produced in a simple manner according to the desired requirements with respect to stability of wire rods as usual in trade. To facilitate the forming of a hook on one end of the rod, that end area of the rod is formed to an approximately rectangular cross-section. At the other end of the rod, the cross-section is also made approximately rectangular with two surfaces in particular being parallel so that they may rest against the web of the link. Thus the cross-section in the end areas can at least be approximately uniform, but the width of the formed wiper arm can differ in these end areas.

In the central section according to an advantageous further development of the invention the wiper rod will have a cross-section with smaller width, but at least partly bigger height than in the end sections. Thereby the stability is increased and the work for forming the wiper rod is reduced. Thereby designs differing to a large extent are possible. In a preferred embodiment, the central section has a cross-section which approaches a square with a triangle put on it like a roof.

BRIEF DESCRIPTION OF THE DRAWING

The invention is described below by way of the embodiments shown in the accompanying drawing, in which FIG. 1 is a lateral view of a wiper rod in a partial section;

FIG. 2 is a cross-section of the wiper rod in the left-hand end area taken on the line of II—II of FIG. 1;

FIG. 3 is a cross-section in the central area taken on the line III—III of FIG. 1;

FIG. 4 is a cross-section in the right-hand end area taken on the line IV—IV of FIG. 1;

FIG. 5 is a cross-section corresponding to FIG. 3 but for another embodiment; and FIG. 6 is a schematic view in order to explain the production process.

DETAILED DESCRIPTION OF THE DRAWING

The wiper rod 10 shown in FIG. 1 as a finished product has three partial sections A, B, C with differing cross-sections as indicated by FIG. 2, 3 and 4. In the section A, the left-hand end section, the wiper rod has two bores 11, 12 for fastening on a link of the wiper arm not shown in detail and for receiving a pull spring respectively. In the section C, thus in the right-hand end area, the wiper rod 10 ends in a hook 13 in known manner which also has an aperture at 14.

As FIGS. 2 and 4 show in the end areas A and C the wiper rod has a nearly similar, i.e. an approximately rectangular cross-section. In this area the width b is much bigger than the height h. In order to adapt the right-hand wiper arm end to the width of the receiver of the matching wiper blade the width b' in this partial area C can be smaller than in the area A.

As FIG. 3 shows the width of the wiper rod in the central area B is smaller, but the height is bigger. Because the central area B is extending over a bigger length than the two areas A and C respectively, the necessary work of forming can be noticeably reduced, if in this area B the height h is as big as possible. Of course this height h must be adjusted to the diameter d of the rod wire used in the production process. Besides the stability of the wiper rod is increased in direction of the arrows, if this height h is selected as big as possible.

FIG. 5 shows a modified embodiment in which in the central area B the cross-section is approximately V-shaped or roof-shaped. Also by this measure the stability of the wiper rod is increased. Of course other types of cross-sections are conceivable and can be provided. In this connection aspects with respect to flow behaviour can be considered in a simple manner.

In FIG. 6 the product from which such a wiper rod is made is designated with 20. It is a wire rod 20 with the diameter d, which for instance can be made of a rustproof chrome nickel steel. Two press-forms are designated with 21 and 22 between which the wire rod is positioned. By pressure exerted in direction of the arrow the wire is formed into the shape shown by the dotted lines. The material is thereby cold-formed, which is favorable with respect to stability.

Finally, it is pointed out that between the areas A and B or B and C a smooth transition of the cross-sections is of advantage. In FIG. 1 this transition is indicated by dotted lines. This does not only entail an advantage with respect to production engineering, but also with respect to style.

The invention is not restricted to the forms of cross-section shown in the drawings. There are rather a series of further alternatives, for instance wiper arms with semicircular or sickle-shaped cross-section.

What is claimed is:

1. A wiper arm comprising a wiper rod formed from a single, solid rod of approximately circular cross section, said wiper arm having first and second end sections, each of said end sections being formed to an approximately rectangular cross-section, and a central section formed to have a cross-section approximately that of a rectangular having a triangle on top, said central section being smaller in width but greater in height than said rectangular cross-section.

* * * * *